United States Patent [19]
Lendle et al.

[11] Patent Number: 5,512,012
[45] Date of Patent: Apr. 30, 1996

[54] SAUSAGE CASING HOLDING DEVICE

[75] Inventors: Erich Lendle, Adelsried; Klaus Markwardt, Laatzen; Bernd Nicolaisen, Verden, all of Germany

[73] Assignee: Vemag Maschinenbau GmbH, Verden, Germany

[21] Appl. No.: 116,123

[22] Filed: Sep. 2, 1993

[30] Foreign Application Priority Data

Sep. 5, 1992 [DE] Germany ............... 9211979 U

[51] Int. Cl.[6] ........................................ A22C 11/10
[52] U.S. Cl. .................. 452/35; 452/32; 452/47; 452/37
[58] Field of Search ..................... 452/35, 32, 33, 452/34, 45, 47, 38

[56] References Cited

U.S. PATENT DOCUMENTS

| 3,731,346 | 5/1973 | Kupcikevicius | 452/45 |
|---|---|---|---|
| 3,739,426 | 6/1973 | Schnell | 452/45 |
| 4,073,039 | 2/1978 | Müller et al. | 452/47 |
| 4,602,402 | 7/1986 | Scanell | 452/37 |
| 4,606,379 | 8/1986 | Nausedas | 452/38 |
| 4,837,896 | 6/1989 | Lockard | 452/38 |
| 4,958,411 | 9/1990 | Stanley | 452/37 |
| 5,074,386 | 12/1991 | Evans | 452/32 |

FOREIGN PATENT DOCUMENTS 3124025 12/1982 Germany ............... 452/32

*Primary Examiner*—Willis Little
*Attorney, Agent, or Firm*—Merchant, Gould, Smith, Edell, Welter & Schmidt

[57] ABSTRACT

A casing holding device for a machine for filling and twisting off sausages includes a filling tube rotatable along its longitudinal axis, onto which a slug can be pulled, and which, on its free end, is equipped with an output opening for the output of sausage fill, and a casing brake which is equipped with a braking ring which surrounds the free end of the filling tube and which essentially rests against this under contact pressure, and a clamping member to secure the slug to the filling tube so as to rotate the slug with the filling tube.

21 Claims, 1 Drawing Sheet

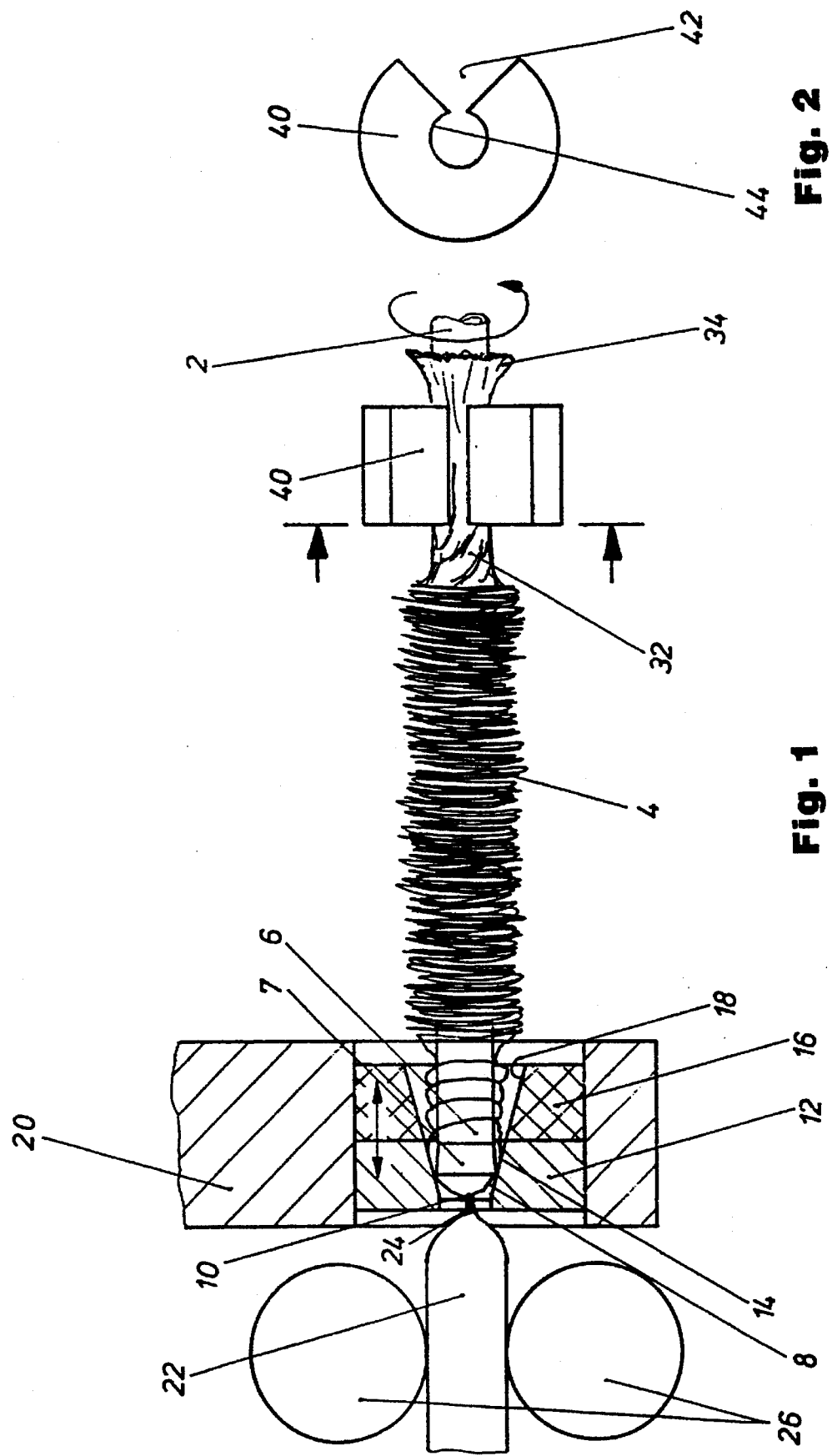

SAUSAGE CASING HOLDING DEVICE

BACKGROUND OF THE INVENTION

The invention concerns a sausage casing holding device for a machine for the filling and twisting off of sausages, with a filling tube rotatable along its longitudinal axis, onto which a slug ('slug'=unfilled casing lengths for multiple sausages) can be pulled, and which, on its free end, is equipped with an output opening for the output of sausage fill, and with a casing brake which is equipped with a braking ring which surrounds the free end of the filling tube and which essentially rests against this under contact pressure.

Sausage casing holding devices of this type are known. The sausage casing holding device is part of a sausage filling and twist-off machine which is charged with sausage fill and which is portioned for filling into the sausage casings. During filling of the thus processed sausage fill into the casing, the slug-like casing which has been pulled onto the filling tube is pulled from the free end of the filling tube which is effected by the sausage fill extruded from the output opening on the free end of the filling tube. During the filling process, the casing brake takes care that the casing is pulled off only with a defined braked velocity under a defined pressure and is therewith stretched so that the sausage is filled with the desired plumpness.

After the sausage casing is filled with a specific portion of sausage fill during the previously described filling process, the filling tube is rotated on its own axis with the help of a twist-off drive in order to achieve a tying off of the filled casing for the formation of the sausage. The filled casing does not follow this rotational motion due to its inertia so that the tying off of the filled casing is on the end of the filling tube, therewith producing single, proportioned sausages are produced.

The braking ring of the casing brake in the known device is driven by means of a separately provided drive in the rotational direction of the filling tube in the twist-off process, whereby a secure carrying of the casing during the twist-off process is possible.

Certainly, the known casing holding device is reliable during the filling process as well as during the twist-off process, however it requires higher manufacturing and maintenance costs which in part are not economical for smaller and middle sized businesses.

It is therefore the task of the invention to simplify a sausage casing holding device of the type mentioned at the outset, that would be economically interesting for smaller and mid-sized firms.

SUMMARY OF THE INVENTION

This task is solved in that for the sausage casing holding device named at the outset, the braking ring is unrotatably situated.

Via the unrotatable arrangement of the braking ring of the casing brake, according to invention, the separate drive now provided in the state of the art rotational drive of the casing brake can now be dropped, whereby not inconsiderable manufacturing and maintenance costs can be saved. Surprisingly, it was found that the friction between the filling tube and the slug mounted on this is generally so high, that during the twist-off process, the slug is carried along by the rotating filling tube, while the filled part of the casing, on account of its comparatively high inertia, does not carry out this rotational movement and, for example, only needs to be correspondingly held and guided by an operator by hand. By this, in the same way, single proportioned sausages are therewith produced as with the state of the art by the tying off of the filled part of the casing without the expensive separate drive for the rotational driving of the braking ring being necessary.

In order to produce an especially good holding friction between the slug and filling tube, the free end of the filling tube, at least on the surface touched by the braking ring, should preferably consist of material which essentially possesses a higher friction coefficient than the inner surface of the braking ring. For this, for example, the free end of the filling tube can have a rubber lip running around it or itself be made of rubber and the braking ring produced, for example, of metal or of a hard synthetic material.

Further, the free end of the filling tube can be equipped with a removable spout, which for the purposes of cleaning of the output opening is an advantage.

For achieving a good braking effect, the braking ring can be equipped with a conical interior surface whose minimal diameter is smaller than and whose maximal diameter is larger than the maximal outer diameter of the filling tube. For this also, the free end of the filling tube can be conically formed whereby the minimal diameter is smaller and the maximal diameter is larger than the maximal interior diameter of the braking ring.

Preferably, a means for setting the pressure of the braking ring to a desired value can be provided. In a preferred additional development of this arrangement, in which the braking ring is equipped with a conical inner surface and/or the free end of the filling tube is conically formed, as a means for providing the setting of contact pressure, a bed for the slidable seating of the braking ring in the longitudinal direction of the filling tube is provided. By this, it is possible to bring the braking ring into contact friction engagement at the desired pressure with the free end of the filling tube. Besides this, in an especially preferred arrangement, provided is a means for feeding out the casing set on the filling tube, whereby preferably a ring can be provided, which is arranged on the side of the braking ring opposite the output opening and whose interior surface exhibits a defined distance to the external surface, such that essentially only one section of the casing is let through between the ring and filling tube.

Instead of holding and guiding the filled sausage by hand, holding mechanisms for holding and guiding the filled sausage without rotation, can be provided, which are especially formed as rollers.

In using artificial casings which have small coefficient friction, clamping means is mounted so as to secure a second end of the slug to the filling tube. Therefore, the slug can be rotated with the filling tube.

These and various other advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

Objects and advantages of the present invention will be seen from the following figures in which a casing holding device is depicted:

FIG. 1 is an enlarged part sectional and part elevational view of the invention showing the same in combination with the casing being stuffed but without the stuffing machine and machinery for further processing stuffed sausages; and FIG. 2 is an end evaluation of a preferred embodiment of the clamping means for securing one end of the casing to the feed horn.

DETAILED DESCRIPTION OF THE PREFERRED EMBODIMENT

The casing holding device depicted in FIG. 1 is part of an undepicted sausage filling and twist-off machine. This machine is in general charged with sausage fill via a feeding hopper/funnel (Fülltrichter), which, then processed, is extruded through a filling tube 2, depicted in FIG. 1, into sausage casings for portioning and filling. For filling into sausage casings, a slug 4 is pulled up from a front free end 6 onto the filling tube 2.

In the accompanying FIG. 1, the sausage holding device is depicted in detail.

As is to be recognized in FIG. 1, the free end 6 of the filling tube 2, upon which a slug 4 is pulled, is equipped with a spout which presents a conically pointed running end 8, in which an output opening 10 is present for an output of a sausage filled casing 22 advanced through filling tube 2 from the sausage fill and twist-off machine. The spout 7 is removable for purposes of cleaning and can have a rubber lip, not depicted in FIG. 1, or itself be made of rubber.

The casing holding device exhibits a casing brake which in the depicted arrangement includes an unrotatably situated braking ring 12. The braking ring 12 surrounds the spout 7 and the free end 6 of the filling tube 2 and lies on this under contact pressure. The braking ring 12 consists of metal and has a conical inner surface 14 whose minimal diameter is smaller than the maximal outside diameter of the filling tube and whose maximal diameter is greater than the maximal outside diameter of the filling tube.

By reason of the previously described arrangement, the braking ring 12 with its conical inner surface 14 can be brought into contact with the conical point 8 of the spout 7, as can be seen in FIG. 1. By this, as the braking ring 12 is positioned movably in an axial direction of the filling tube 2, the contact pressure of the braking ring 12 on the spout 7 is adjustable.

On the front side of the braking ring 12, which faces the filling tube 2, sits a feedout ring 16 whose interior surface 18 in the depicted arrangement is aligned the conical inner surface 14 of the braking ring 12, and hence is likewise formed conically. By this, the interior surface 18 of the feedout ring 16 exhibits a defined distance to an outer surface of the filling tube 2 such that essentially only one section of a casing from the slug 4 is led through between the feedout ring 16 and the filling tube 2 in direction of the braking ring 12 toward the left according to the depicted FIG. 1.

The braking ring 12 and the feedout ring 16 are anchored on one holding part 20 which is formed such that the braking ring 12 and the feedout ring 16 can be changed when necessary, e.g. for purpose of maintenance or cleaning. The holding piece 20 is positioned movably in the axial direction of the filling tube and whose position vis-a-vis the filling tube 2 can be adjusted for producing the desired contact pressure.

In order to be able to pull on a new slug, the holding piece 20 along with the braking ring 12 and the feedout ring 16, in a manner here not depicted and in a manner which is here not to be further elucidated, can be turned aside so that the free end 6 of the filling tube 2 is accessible.

For the filling process, the sausage fill is pressed through the filling tube 2 by a pump and filled through the output opening 10 into a filled section 22 of the casing pulled off from the slug 4. In this, the feedout ring 16 guarantees that only one length of the casing is pulled at a time from the slug 4 which is mounted on the filling tube 2, and that, simultaneously, the remaining slug 4 is held back, while the braking ring 12 has the task to provide a defined braked pulling-off movement of the casing so that the pulled-off filled casing 22 of the casing is filled to the desired plumpness.

After the extrusion of a determined portion amount of sausage fill, the twist-off process follows. For this, the filling tube 2 is situated rotatable along its longitudinal axis, and the filling tube 2 is rotated during the twist-off process in order to produce a tying off 24 of the filled casing 22, whereby the filled casing 22 of the casing is made into a finished sausage.

The filled casing 22, due to its inertia, does not follow the rotational motion of the filling tube 2 whereas, in contrast, the slug 4 is carried rotationally by the filling tube 2. In order to guarantee the carrying of the slug 4 during the rotation of the filling tube 2, and to hinder a through slippage of the filling tube 2, the free end 6 of the filling tube 2 in general consists of a material which essentially possesses a higher friction coefficient than the interior surface 14 of the braking ring 12. Toward this end, the spout 7 should—as previously mentioned—have a rubber lip around its circumference or itself consist of rubber, while the braking ring 12 consists of metal, whereby its interior surface should preferably be polished.

During the filling process and the following twist-off process, the filled casing 22 of the casing can be held and guided by an operator. For increasing the operational comfort, a pair of holding rollers 26 are provided for the depicted arrangement which hold and guide the filled casing 22 of the casing securely and without rotation.

However, for those artificial casing materials of the slug 4 which when being placed on the filling tube 2 as a shirred casing and which when pressed by the braking ring 12 against the spout 7 of the filling tube 2, the slug 4 does not rotate together with the rotating filling tube 2 because of a too small coefficient of friction between the artificial casing materials and the rotating filling tube 2. There is shown a clamping member 40 being used to secure the casing materials at a second end 34 of the slug 4 to the outer surface of filling tube 2 while the slug 4 at the free end 6 of the filling tube 2 is withdrawn by the emulsion extruded through the free end 6 of the filling tube 2 through the defined section between the outer most surface of the spout 7 and the conical inner surface 14 of the braking ring 12. A usual length between first and second ends of the slug 4 is approximately 10 inches. The slug 4 holds approximately 50 feet of one casing of sausages. It is appreciated that the lengths can be varied according to various embodiments.

The clamping member 40 securing the casing materials at the second end 34 of the slug 4 to the filling tube 2 is in the form of elastic clamping member 40. There is shown in FIG. 2 that the clamping member 40 has a central bore 44 of a diameter which is smaller than the outer diameter of the filling tube 2. The outer diameter of the clamping member 40 is sufficiently large to allow proper handling of the clamping member 40 and to make the clamping member 40 sufficiently thick so as to achieve a good elastic clamping force.

FIG. 2 shows an end elevation of the clamping member 40. It can be seen that the clamping member 40 in the preferred embodiment takes the form of a rubber cylinder with an axial central bore 44 and being provided with an axially extending wedge-like cut 42 connecting the outer and inner surfaces of the clamping member 40, whereby the clamping member 40 takes the form of the letter "C" and can easily be spread apart and be pushed over a casing area 32 close to the second end 34 of slug 4.

Alternatively, the clamping member 40 can be means made from metal or plastic material being securely fastened to the outer surface of the filling tube 2 close to the inner end of the filling tube 2, the inner end being defined by the housing (not shown) of the stuffing machine (not shown) from which the sausage meat or other emulsion is pumped through the filling tube 2.

A still further embodiment of the clamping member 40 of the invention is provided by an adhesive tape applied such that part of the tape covers at least part of the casing materials of the slug 4 at the second end 34 while the other part of the tape sticks to the outer surface of the filling tube 2 immediately adjacent the second end 34 of the slug 4.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A casing holding device used in a machine for filling and twisting off sausages, the casing holding device comprising:

a filling tube rotatable along an longitudinal axis, the filling tube having a free end;

a slug being pulled onto the filling tube;

an output opening, being disposed at the free end of the filling tube, for an output of a filled sausage slug;

a casing brake having a braking ring, the braking ring surrounding the free end of the filling tube, and the braking ring being disposed against the filling tube under a contact pressure;

wherein the braking ring is non-rotationally situated;

wherein the free end of the filling tube, at least on an exterior surface contacted by the braking ring, is made of a material which has a higher friction coefficient than that of an interior surface of the braking ring.

2. A casing holding device according to claim 1, wherein the free end of the filling tube has a surrounding rubber lip.

3. A casing holding device according to claim 2, wherein the braking ring is made from either metal or a hard synthetic material.

4. A casing holding device according to claim 3, wherein the free end of the filling tube is formed as a removable spout.

5. A casing holding device according to claim 4, wherein the braking ring has a conical interior surface whose minimal diameter is smaller than a maximal outer diameter of the filling tube and whose maximal diameter is greater than the maximal outer diameter of the filling tube.

6. A casing holding device according to claim 5, wherein the free end of the filling tube is conically formed, whereby whose minimal outer diameter and whose maximal outer diameter are greater than a maximal inner diameter of the braking ring.

7. A casing holding device according to claim 6, further comprising means for adjusting the contact pressure of the braking ring to a desired value.

8. A casing holding device according to claim 7, wherein the adjusting means includes a holding piece for movably positioning the braking ring along a longitudinal axis of the filling tube.

9. A casing holding device according to claim 1, further comprising means for feeding out of the slug mounted on the filling tube.

10. A casing holding device according to claim 9, wherein feeding means includes a ring which is disposed on one side of the braking ring opposite the output opening, and an interior surface of the ring exhibits a defined distance to an outer surface of the filling tube such that only one layer of the slug is let through between the ring and the filling tube.

11. A casing holding device according to claim 10, further comprising means for holding a filled casing of sausages without rotation and guiding the filled casing of sausages.

12. A casing holding device according to claim 11, wherein the holding and guiding means includes at least a roller.

13. A casing holding device according to claim 1, wherein the free end of the filling tube is made of rubber.

14. A casing holding device according to claim 1, wherein the slug is made of artificial materials which have a coefficient of friction such that the slug does not rotate together with a rotating filling tube.

15. A casing holding device according to claim 14, further comprising clamping means for securing a second end of the slug, away from the free end of the filling tube, to an outer surface of the filling tube so as to reduce a relative rotational movement between the second end of the slug and the filling tube.

16. A casing holding device according to claim 15, wherein the clamping means includes an elastic clamping member having a central bore of a diameter smaller than the outer diameter of the filling tube, and an outer diameter of clamping member being sufficiently large to assert an elastic clamping force on the slug and the filling tube.

17. A casing holding device according to claim 16, wherein the clamping member is a rubber cylinder having an axial central bore and an axially extending wedge-like cut portion for spreading apart and being pushed over the slug and the filling tube.

18. A casing holding device according to claim 17, wherein the clamping member is made from either metal or plastic materials, the clamping member securely fastening the slug and the outer surface of the filling tube.

19. A casing holding device according to claim 17, wherein the clamping member is made of an adhesive tape, a part of said tape covers at least a part of the slug at the second end while the other part of the tape sticks to the outer surface of the filling tube immediately adjacent the second end of the slug.

20. A casing holding device for a machine for filling and twisting off sausages, comprising:

a filling tube rotatable along a longitudinal axis, onto which a slug is pulled, and which, on a free end of the filling tube, is equipped with an output opening for an output of a filled sausage slug;

a casing brake, which is equipped with a braking ring surrounding the free end of the filling tube and essentially resting against the filling tube under a contact pressure, the braking ring being non-rotationally situated;

means for rotating the slug by a rotating filling tube;
wherein the rotating means includes a material of the slug having a higher friction coefficient than an interior surface of the braking ring at least at the free end of the filling tube.

21. A casing holding device according to claim 20, wherein the rotating means includes clamping means for securing a second end of the slug, away from the free end of the filling tube, to an outer surface of the filling tube so as to reduce a relative rotational movement between the second end of the slug and the filling tube.

* * * * *

UNITED STATES PATENT AND TRADEMARK OFFICE
CERTIFICATE OF CORRECTION

PATENT NO. : 5,512,012

DATED : April 30, 1996

INVENTOR(S) : Erich Lendle; Klaus Markwardt; Bernd Nicolaisen

It is certified that error appears in the above-identified patent and that said Letters Patent is hereby corrected as shown below:

On the title page, item [30], "9211979 U" should read --92 11 979.4--.

Signed and Sealed this

Fifth Day of November, 1996

Attest:

BRUCE LEHMAN

Attesting Officer    Commissioner of Patents and Trademarks